(12) United States Patent
Liao et al.

(10) Patent No.: US 11,347,260 B2
(45) Date of Patent: May 31, 2022

(54) FRONT LIGHT MODULE AND DISPLAY DEVICE HAVING THE SAME

(71) Applicant: E Ink Holdings Inc., Hsinchu (TW)

(72) Inventors: Ching-Huan Liao, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/133,662

(22) Filed: Dec. 24, 2020

(65) Prior Publication Data
US 2021/0333826 A1 Oct. 28, 2021

(30) Foreign Application Priority Data
Apr. 24, 2020 (TW) ................ 109113879

(51) Int. Cl.
*G06F 1/16* (2006.01)
*F21V 8/00* (2006.01)

(52) U.S. Cl.
CPC .......... *G06F 1/1607* (2013.01); *G02B 6/005* (2013.01); *G02B 6/0068* (2013.01)

(58) Field of Classification Search
None
See application file for complete search history.

(56) References Cited

U.S. PATENT DOCUMENTS

| | | | |
|---|---|---|---|
| 7,448,787 B2 | 11/2008 | Kim et al. | |
| 7,494,234 B2 | 2/2009 | Chang | |
| 7,559,683 B2 | 7/2009 | Lee | |
| 7,760,290 B2 | 7/2010 | Kang et al. | |
| 8,979,342 B2 | 3/2015 | Neugebauer et al. | |
| 8,979,349 B2* | 3/2015 | Bita ............. | G02B 6/0036 |
| | | | 362/623 |
| 9,039,268 B2 | 5/2015 | Ma | |
| 9,229,149 B2 | 1/2016 | Wheatley et al. | |
| 9,285,530 B2 | 3/2016 | Neugebauer et al. | |
| 10,132,966 B2 | 11/2018 | Sun et al. | |
| 10,180,526 B2* | 1/2019 | Pao ............. | G02B 6/0036 |
| 2008/0084708 A1 | 4/2008 | Lee et al. | |

(Continued)

FOREIGN PATENT DOCUMENTS

| | | |
|---|---|---|
| JP | 2012528467 A | 11/2012 |
| TW | 201544858 A | 12/2015 |
| TW | 201614290 A | 4/2016 |

OTHER PUBLICATIONS

Corresponding Taiwan office action dated May 19, 2021.

*Primary Examiner* — Britt D Hanley
(74) *Attorney, Agent, or Firm* — CKC & Partners Co., LLC

(57) ABSTRACT

A front light module includes a light source having a light emitting surface and a light guide plate having a microstructure region. The microstructure region includes a first microstructure and a second microstructure. The first microstructure is located between the light emitting surface of the light source and the second microstructure. A surface of the first microstructure close to the light source and a direction of an optical axis have a first angle. A surface of the first microstructure away from the light source and the direction of the optical axis have a second angle. A surface of the second microstructure away from the light source and the direction of the optical axis have a third angle. The first angle and the second angle are respectively in a range of 30 degrees to 50 degrees and a range of 60 degrees to 90 degrees.

20 Claims, 16 Drawing Sheets

(56) References Cited

U.S. PATENT DOCUMENTS

2008/0165306 A1    7/2008  Kang et al.
2016/0238777 A1*  8/2016  Chen ................... G02B 6/0036
2019/0137798 A1    5/2019  Lee et al.

* cited by examiner

| First length (μm)/ second length (μm) | Light width along the horizontal direction (degree) |
|---|---|
| 150/67 | 32 |
| 125/80 | 38 |
| 100/100 | 48 |
| 80/125 | 63 |
| 67/150 | NA |

Fig. 13

FRONT LIGHT MODULE AND DISPLAY DEVICE HAVING THE SAME

CROSS-REFERENCE TO RELATED APPLICATION

This application claims priority to Taiwan Application Serial Number 109113879, filed Apr. 24, 2020, which is herein incorporated by reference in its entirety.

BACKGROUND

Field of Invention

The present invention relates to a front light module and a display device having the same.

Description of Related Art

The dot pattern of the front light module of the conventional light guide plate is used for guide light, and the dot pattern commonly has crater shape or non-dispersed linear groove. The light width of the guided light is large when such configuration is employed in a reflective display panel, such that the light collimation is poor. In addition, the angle of the guided light deviating from the vertical direction (the normal direction of the light guide plate) is large, such that the lights of adjacent two sub-pixels may mix easily and the color saturation of the display panel may be reduced.

SUMMARY

One aspect of the present disclosure is a front light module.

In some embodiments, the front light module includes a light source having a light emitting surface and a light guide plate having a microstructure region. The microstructure region includes a first microstructure and at least one second microstructure. The first microstructure is located between the light emitting surface of the light source and the second microstructure. A surface of the first microstructure close to the light source and a direction of an optical axis of the light source have a first angle therebetween. A surface of the first microstructure away from the light source and the direction of the optical axis have a second angle therebetween. A surface of the second microstructure away from the light source and the direction of the optical axis have a third angle therebetween. The first angle is in a range of 30 degrees to 50 degrees, and the second angle and the third angle are in a range of 60 degrees to 90 degrees.

In some embodiments, the first microstructure and the second microstructure are recessed from a top surface of the light guide plate.

In some embodiments, when viewed from above, the first microstructure and the second microstructure each has a circular shape, an ellipse shape or a diamond shape.

In some embodiments, the first microstructure and the second microstructure each has a first length along a direction of an optical axis of the light source and a second length along a horizontal direction perpendicular to the direction of the optical axis, and a ratio of the first length over the second length is in a range of 0.5 to 2.5.

In some embodiments, a surface of the second microstructure close to the light source and the direction of an optical axis have a fourth angle therebetween, and the fourth angle is the same as the first angle.

In some embodiments, the second angle is the same as the third angle.

In some embodiments, a number of the second microstructure is plural, and the third angles of the second microstructures are the same.

In some embodiments, the front light module further includes a color filter layer, and the color filter layer has a sub-pixel, and a number of the second microstructure increased as a width of the sub-pixel decreases.

In some embodiments, the first microstructure and one of adjacent two of the second microstructures have a distance therebetween, and the distance is in a range of 1 micrometer to 20 micrometers.

In some embodiments, the first microstructure is connected with the second microstructure.

In some embodiments, a number of the second microstructure is plural, and the second microstructures are connected with each other.

Another aspect of the present disclosure is a display device having a front light module.

In some embodiments, the display device includes a front light module and a display device. The front light module includes a light source having a light emitting surface and a light guide plate having a microstructure region. The microstructure region includes a first microstructure and at least one second microstructure. The first microstructure is located between the light emitting surface of the light source and the second microstructure. A surface of the first microstructure close to the light source and a direction of an optical axis of the light source have a first angle therebetween. A surface of the first microstructure away from the light source and the direction of the optical axis have a second angle therebetween. A surface of the second microstructure away from the light source and the direction of the optical axis have a third angle therebetween. The first angle is in a range of 30 degrees to 50 degrees, and the second angle and the third angle are in a range of 60 degrees to 90 degrees. The display panel is located below the light guide plate.

In some embodiments, the first microstructure and the second microstructure are recessed from a top surface of the light guide plate.

In some embodiments, when viewed from above, the first microstructure and the second microstructure each has a circular shape, an ellipse shape or a diamond shape.

In some embodiments, the first microstructure and the second microstructure each has a first length along a direction of an optical axis of the light source and a second length along a horizontal direction perpendicular to the direction of the optical axis, and a ratio of the first length over the second length is in a range of 0.5 to 2.5.

In some embodiments, a surface of the second microstructure close to the light source and the direction of an optical axis have a fourth angle therebetween, and the fourth angle is the same as the first angle.

In some embodiments, the second angle is the same as the third angle.

In some embodiments, a number of the second microstructure is plural, and the third angles of the second microstructures are the same.

In some embodiments, the front light module further includes a color filter layer, and the color filter layer has a sub-pixel, and a number of the second microstructure increased as a width of the sub-pixel decreases.

In some embodiments, the first microstructure and one of adjacent two of the second microstructures have a distance therebetween, and the distance is in a range of 1 micrometer to 20 micrometers.

In the aforementioned embodiments, by disposing the first microstructure and at least one second microstructure in the microstructure region, and by adjusting the first angle and the second angle of the first microstructure and the third angle of the second microstructure, the angle between the light transmits toward the display panel and the vertical direction (the normal direction of the light guide plate) can be reduced. As such, the possibility for mixing the lights from adjacent two sub-pixels can be decreased so as to increase the color saturation of the display device. In addition, since the light may transmits downward more vertically after being reflected by the second microstructure, the light incident toward the display panel can be more concentrated, and the light width is narrower. As such, the light scattering of the light guide plate due to light guiding may be reduced and the light collimation of the light guide plate may be enhanced.

BRIEF DESCRIPTION OF THE DRAWINGS

The invention can be more fully understood by reading the following detailed description of the embodiment, with reference made to the accompanying drawings as follows:

FIG. 13 is a data of the first length, the second length, and the light width along the horizontal direction in FIG. 12.

DETAILED DESCRIPTION

Figure 1:
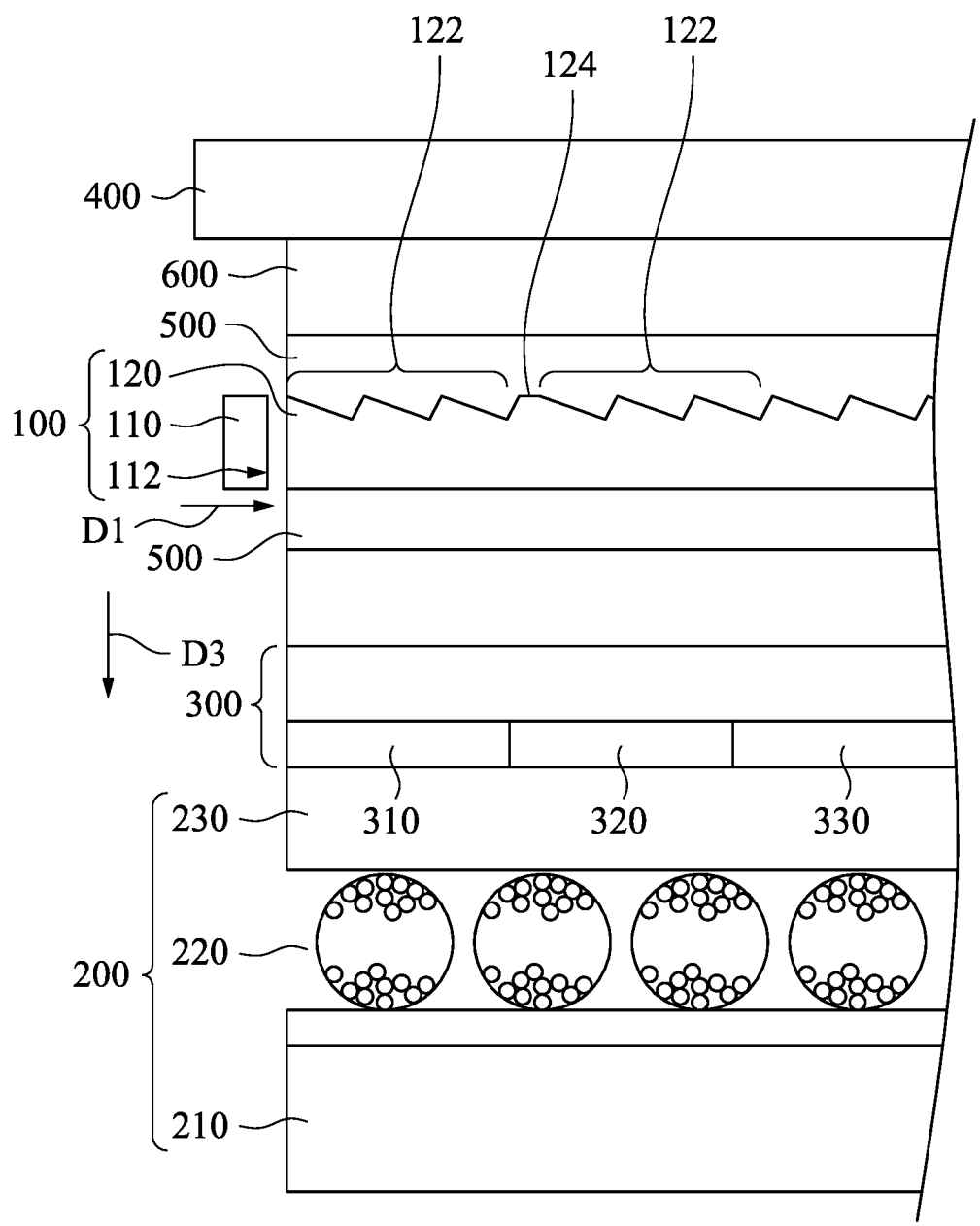
FIG. 1 is a cross sectional view of a display device according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a cross sectional view of a display device 10 according to one embodiment of the present disclosure. The display device 10 includes a front light module 110 and a display panel 200. The front light module 100 includes a light source 110, a light guide plate 120, a color filter layer 300, and a cover structure 400. The light guide plate 120 is located between the cover structure 400 and the color filter layer 300. The color filter layer 300 is located between the display panel 200 and the light guide plate 120. The display panel 200 may be an electrophoresis display panel or liquid crystal display panel, but the present disclosure is not limited in these regards as long as the display device can be employed in a front light module 100.

Figure 2A:
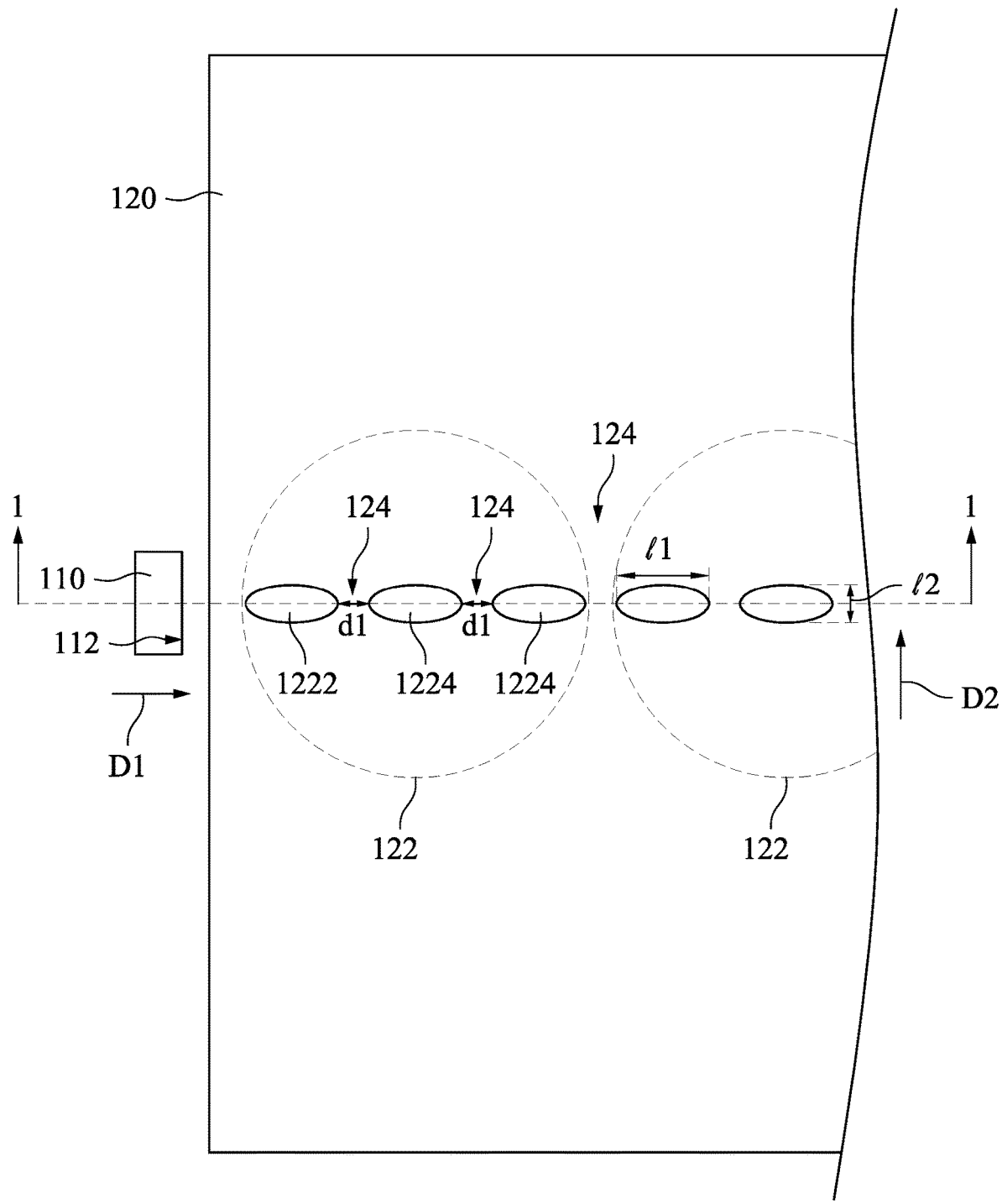
FIG. 2A is a top view of the light source and the light guide plate in FIG. 1.

FIG. 2A is a top view of the light source 110 and the light guide plate 120 in FIG. 1. FIG. 1 is a cross sectional view taken along the line 1-1 in FIG. 2A. For clarity, the cover structure 400 on the light guide plate 120 and other structures are omitted in FIG. 2A. Reference is made to FIG. 1 and FIG. 2A. The light source 110 has a light emitting surface 112, and the light emitting surface 112 faces the light guide plate 120. The light guide plate 120 includes a microstructure region 122, and the microstructure region 122 includes a first microstructure 1222 and at least one second microstructure 1224. The light source 110 has a direction of the light axis D1 facing the light guide plate 120 from the light source 110. That is, the horizontal direction in FIG. 1. The first microstructure 1222 is located between the light emitting surface 112 of the light source 110 and the second microstructure 1224. In other words, the first microstructure 1222 of each of the microstructure region 122 is located at a side closer to the light source 110, and the second microstructure 1224 is located at a side further away from the light source 110. That is, the light from the light source 110 may pass through the first microstructure 1222 first, and then the light may pass through the second microstructure 1224. The first microstructure 1222 and the second microstructure 1224 each has a first length l1 along the direction of light the axis and a second length l2 along the horizontal direction D2.

In the present embodiment, the light guide plate 120 has a top surface 124 facing the cover structure 400. A portion of the top surface 124 extends to a position between the first microstructure 1222 and the second microstructure 1224, and the portion is planar. In other words, as illustrated in FIG. 1, the top surface 124 of the light guide plate 120 has zig-zag shape, and there light guide plate 120 has a plane located between the first microstructure 1222 and the second microstructure 1224 or between adjacent two of the second microstructures 1224. That is, the first microstructure 1222 and the second microstructure 1224 are recessed from the top surface 124 of the light guide plate 120. An interval d1 exists between the first microstructure 1222 and the second microstructure 1224 adjacent to the first microstructure 1222, and the interval d1 is in a range of 1 micrometer to 20 micrometers. In other words, each of the first microstructure 1222 and the second microstructure 1224 are separated from each other. As shown in FIG. 2A, the top surface 124 surrounds the first microstructure 1222 and the second microstructure 1224, and the interval d1 is the minimal distance between the first microstructure 1222 and the second microstructure 1224 or between adjacent two of the second microstructures 1224.

Figure 2B:
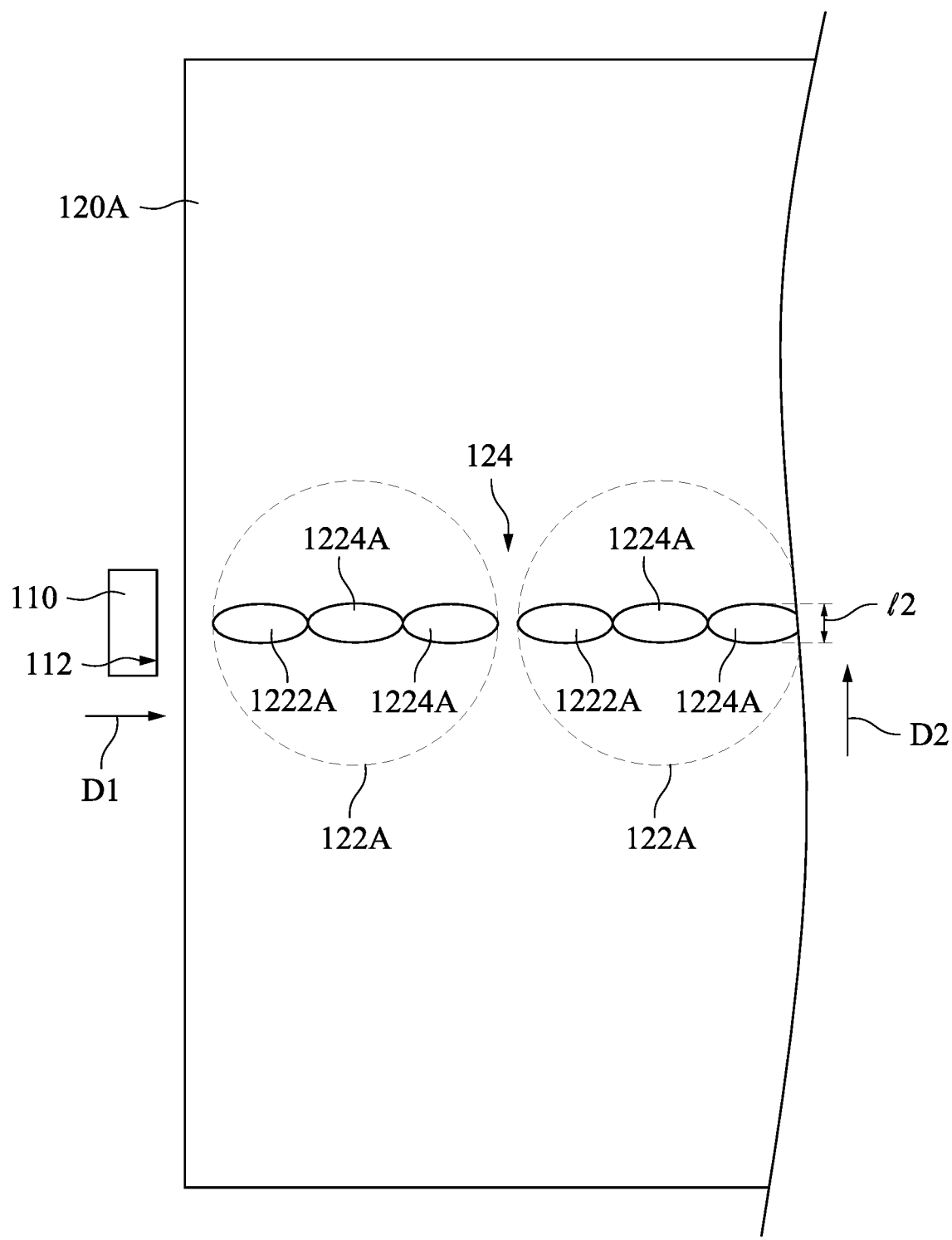
FIG. 2B is a top view of a light source and a light guide plate according to another embodiment of the present disclosure.

FIG. 2B is a top view of a light source 110 and a light guide plate 120A according to another embodiment of the present disclosure. The light guide plate 120A is substantially the same as the light guide plate 120 in FIG. 2A, and the difference is that there is no interval between the first microstructure 1222A and the second microstructure 1224A of the microstructure region 122A of the light guide plate 120A. In other words, in the present embodiment, the first microstructure 1222A and the second microstructure 1224A or adjacent two of the second microstructures 1224A are connected with each other.

When viewed from above, the first microstructure 1222 and the second microstructure 1224 each has a circular shape, an ellipse shape, or a diamond shape, and the ellipse shape is demonstrated in FIG. 2B. In the present embodiment, each of the microstructure regions 122 has two second microstructures 1224. In some other embodiments, a number of the second microstructures 1224 may be from one to five, and it may depend on the practical condition that will be described in the following paragraphs.

Figure 3:
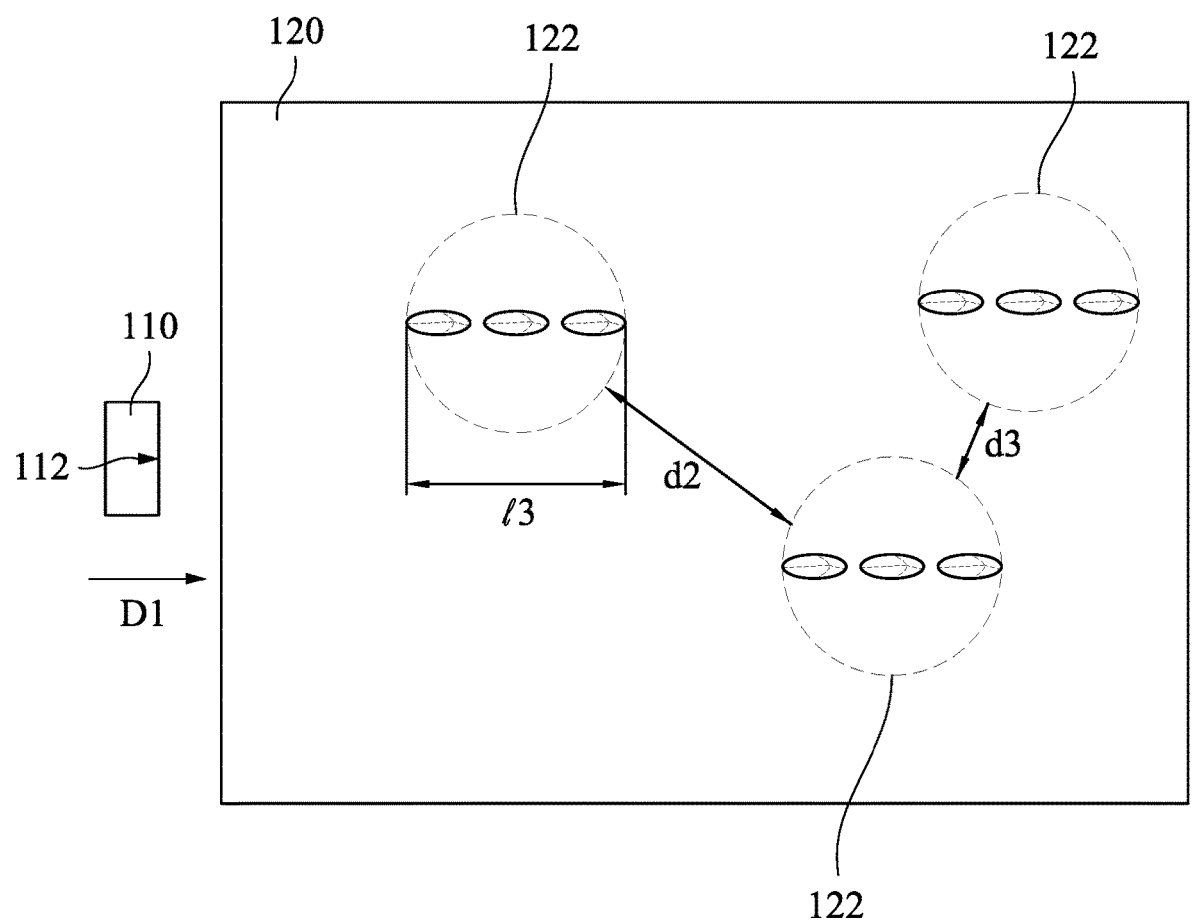
FIG. 3 is a top view of a light source and a light guide plate according to one embodiment of the present disclosure.

FIG. 3 is a top view of a light source 110 and a light guide plate 120 according to one embodiment of the present disclosure. The light guide plate 120 in FIG. 3 may be the same as the light guide plate 120 in FIGS. 1 and 2A. The light guide plate 120 includes several microstructure regions 122. A length l3 of the microstructure region 122 along the direction of the light axis D1 is in a range of 60 micrometers to 100 micrometers. A distance between each of the microstructure regions 122 various along the distance away from the light source 110. In the present embodiment, the region of the light guide plate 120 further away from the light source 110 has microstructure regions 122 which are denser, and the region of the light guide plate closer to the light source 110 has microstructure regions 122 which are sparser. For example, an interval d3 is between the microstructure regions 122 further away from the light source 110, and an interval d2 is between the microstructure regions 122 closer to the light source 110. The interval d3 is smaller than the interval d3 such that the light guided by the light guide plate 120 has uniform light intensity.

Reference is made to FIG. 1. The display device 10 further includes two optical adhesive layers 500 respectively located at two opposite sides of the light guide plate 120. In some embodiments, the optical adhesive layer 500 includes silicon-based material, and the refractive index is about 1.41. In some other embodiments, the optical adhesive layer 500 includes acrylic-based material, and the refractive index is about 1.47. The color filter layer 300 includes several sub-pixels 310, 320, 330. For example, the sub-pixels 310, 320, 330 respectively correspond to the red color sub-pixel, blue sub-pixel, and green sub-pixel. The display panel 200 includes a driving substrate 210, a display medium layer 220, and an adhesive layer 230. The adhesive layer 230 is located between the color filter layer 300 and the display medium layer 220, and the display medium layer 220 is located between the adhesive layer 230 and the driving substrate 210.

Figure 4:
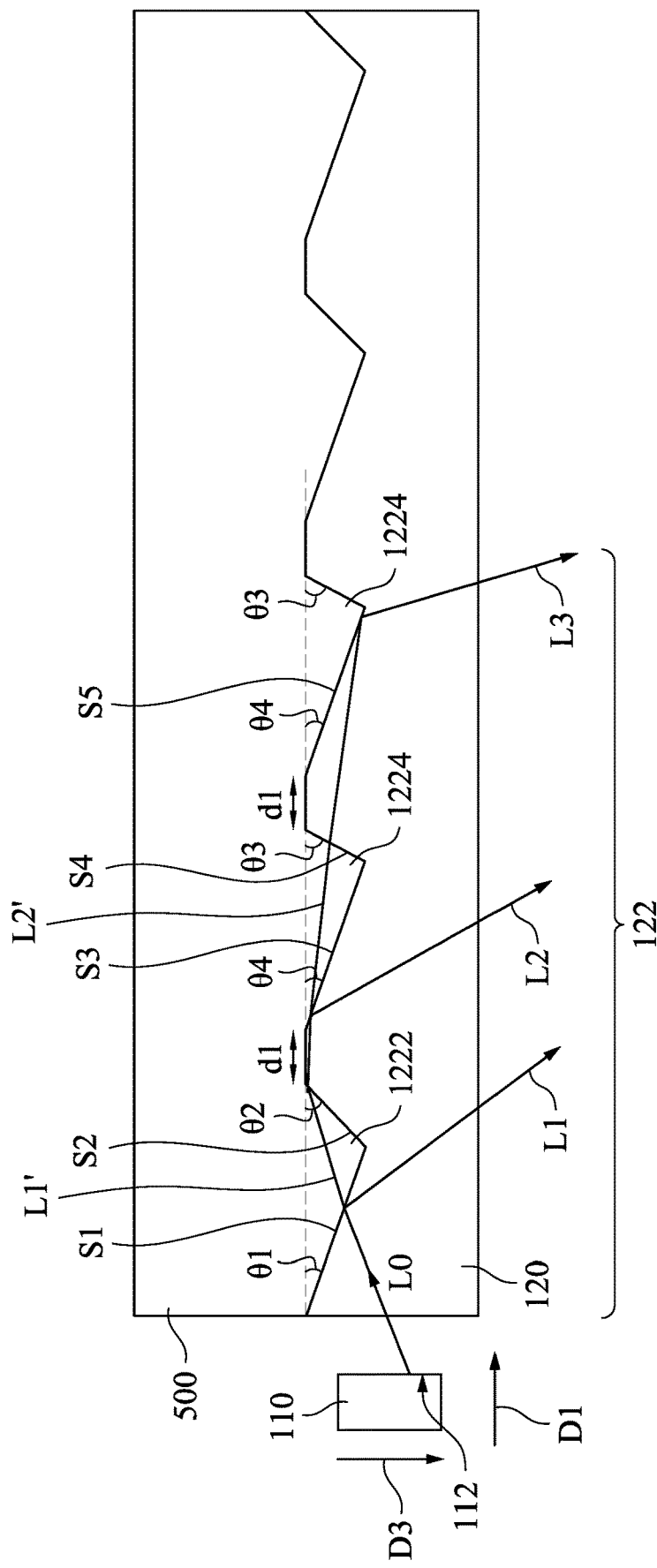
FIG. 4 is an enlarged view of the light source, the light guide plate, and the optical adhesive layer in FIG. 1.

FIG. 4 is an enlarged view of the light source 110, the light guide plate 120, and the optical adhesive layer 500 in FIG. 1. In the present embodiment, the microstructure 122 having the interval d1 between the adjacent first microstructure 1222 and/or second microstructure 1224 are demonstrated as an example. The first microstructure 1222 has a surface S1 close to the light source 110 and a surface S2 away from the light source 110. The cross sectional views of the surface S1 and the surface S2 along the direction of the optical axis D1 have zig-zag shapes. In other words, the surface S1 is located between the surface S2 and the light emitting surface 112 of the light source 110. The surface S2 is located between the surface S1 and the second microstructures 1224. The surface S1 of the first microstructure 1222 and the direction of the optical axis D1 have a first angle $\theta 1$ therebetween, and the first angel $\theta 1$ is in a range of 30 degrees to 50 degrees. The surface S2 of the second microstructures 1224 and the direction of the optical axis D1 have a second angle $\theta 2$ therebetween, and the first angel $\theta 2$ is in a range of 60 degrees to 90 degrees.

The second microstructure 1224 has a surface S3 close to the light source 110 and a surface S4 away from the light source 110. The cross sectional views of the surface S3 and the surface S4 along the direction of the optical axis D1 have zig-zag shapes. In other words, the surface S3 is located between the surface S4 and the first microstructure 1222. The surface S4 is located between the surface S3 and another second microstructures 1224.

The surface S3 of the second microstructure 1224 and the direction of the optical axis D1 have a fourth angle $\theta 4$ therebetween that is the same as the first angle $\theta 1$ of the first microstructure 1222. The surface S4 of the second microstructures 1224 and the direction of the optical axis D1 have a third angle $\theta 3$ therebetween, and the third angle $\theta 3$ is in a range of 60 degrees to 90 degrees.

The first angle $\theta 1$, the second angle $\theta 2$, and the third angle $\theta 3$ may be determined based on the difference between the refractive index of the material of the light guide plate 120 and the refractive index of the material adjacent to the light guide plate 120. In some embodiment, the number of the second microstructures 1224 is plural, and the third angle $\theta 3$ of the second microstructures 1224 are the same. In some embodiments, the second angle $\theta 2$ of the first microstructure 1222 may be the same as the third angle $\theta 3$ of the second microstructures 1224.

For example, in the embodiment shown in FIG. 4, the material of the light guide plate 120 is Polycarbonate (PC), and the refractive index is about 1.59. The optical adhesive layer 500 on the light guide plate 120 includes acrylic acid, and the refractive index is about 1.47. The difference of the refractive indexes of the light guide plate 120 and the optical adhesive layer 500 on the top surface 124 of the light guide plate 120 is about 0.1 to 0.12. In the present embodiment, the first angle $\theta 1$ is preferably in a range of 32.5 degrees to 37.5 degrees. The vertical direction D3 illustrate in the figure is a direction perpendicular to the direction of the optical axis D1. That is, the direction facing the display panel 200 from the cover structure 400 in FIG. 1. The direction of the optical axis D1, the horizontal direction D2, and the vertical direction D3 are perpendicular to each other.

As shown in FIG. 4, the reflection light L1 represents a portion of the incident light L0 from the light source 110 reflected by the surface S1 of the first microstructure 1222, and the light transmits toward downward shown in the figure. The transmission light L1' represents a portion of the incident light L0 transmitted through the surface S1 of the first microstructure 1222. The reflection light L2 represents a portion of the transmission light L1' that is subsequently reflected by the surface S3 of the second microstructure 1224 after transmitted through the surface S2. The reflection light L2 transmits downward more vertically than the reflection light L1. That is, the angle between the reflection light L2 and the vertical direction D3 is smaller than the angle between the reflection light L1 and the vertical direction D3. The transmission light L2' represents the portion of the reflection light L1' transmitted through the surface S3 of the second microstructure 1224. The reflection light L3 represents a portion of the transmission light L2' that subsequently transmitted through the surface S5 of the second microstructure 1224 after transmitted through the surface S4. The reflection light L3 transmits downward more vertically than the reflection light L2. That is, the angle between the reflection light L3 and the vertical direction D3 is smaller than the angle between the reflection light L2 and the vertical direction D3.

Accordingly, by disposing the first microstructure 1222 and at least one second microstructure 1224 in the microstructure region 122, the angle between the light incident toward the display panel 200 (that is the sum of the reflection light L1, the reflection light L2, and the reflection light L3) and the vertical direction D3 is decreased. As such, the possibility for mixing the lights from adjacent two sub-pixels can be decreased so as to increase the color saturation of the display device 10. In addition, since the reflection light L2, L3 reflected by the second microstructure 1224 can transmit downward more vertically, the light incident toward the display panel 200 can be more concentrated, and the light width is narrower. As such, the light scattering of the light guide plate 120 due to light guiding may be reduced and the light collimation of the light guide plate 120 may be enhanced.

Figure 5A:
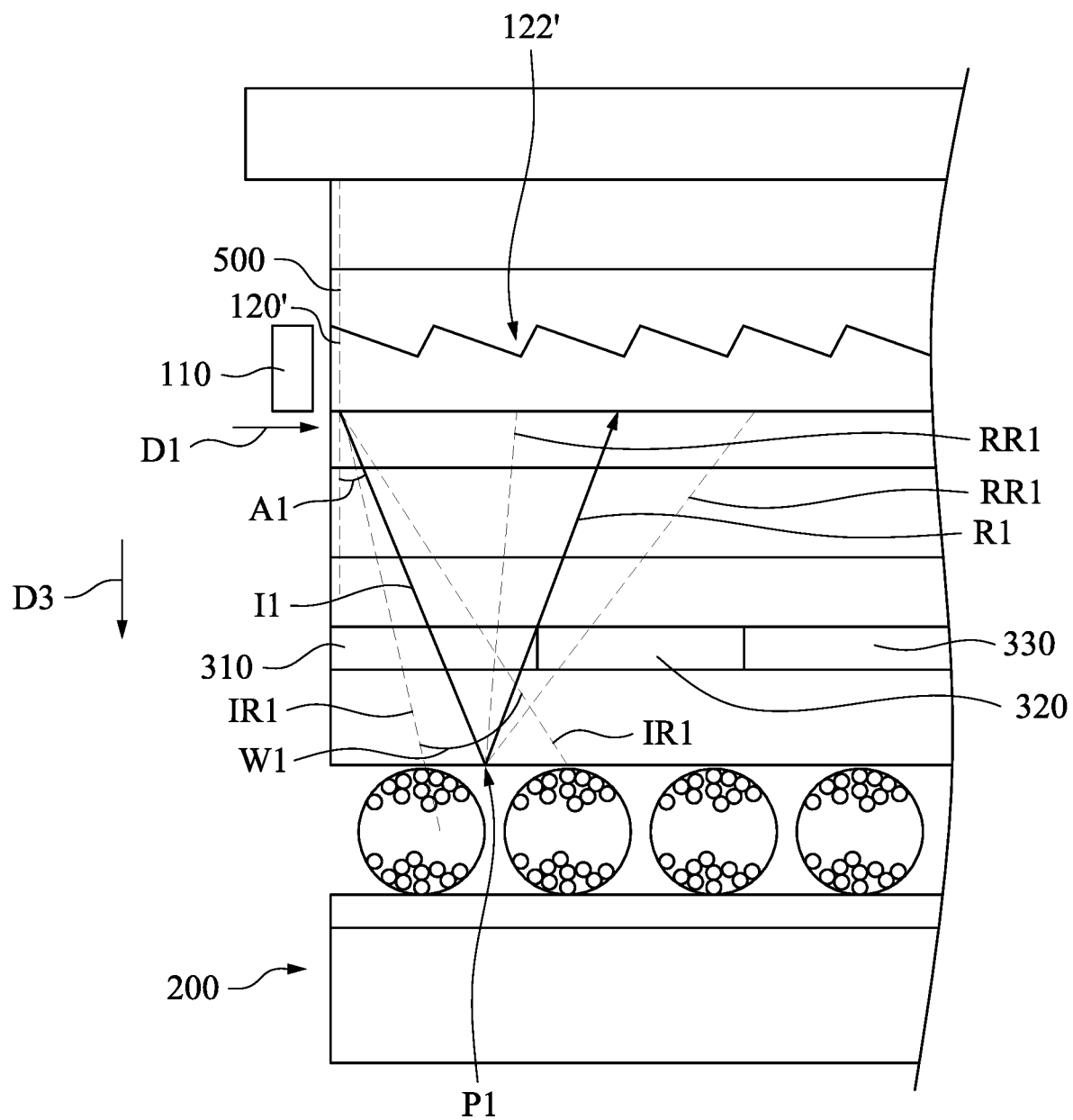
FIG. 5A is a schematic of a light path of an exemplary display device.
Figure 5B:
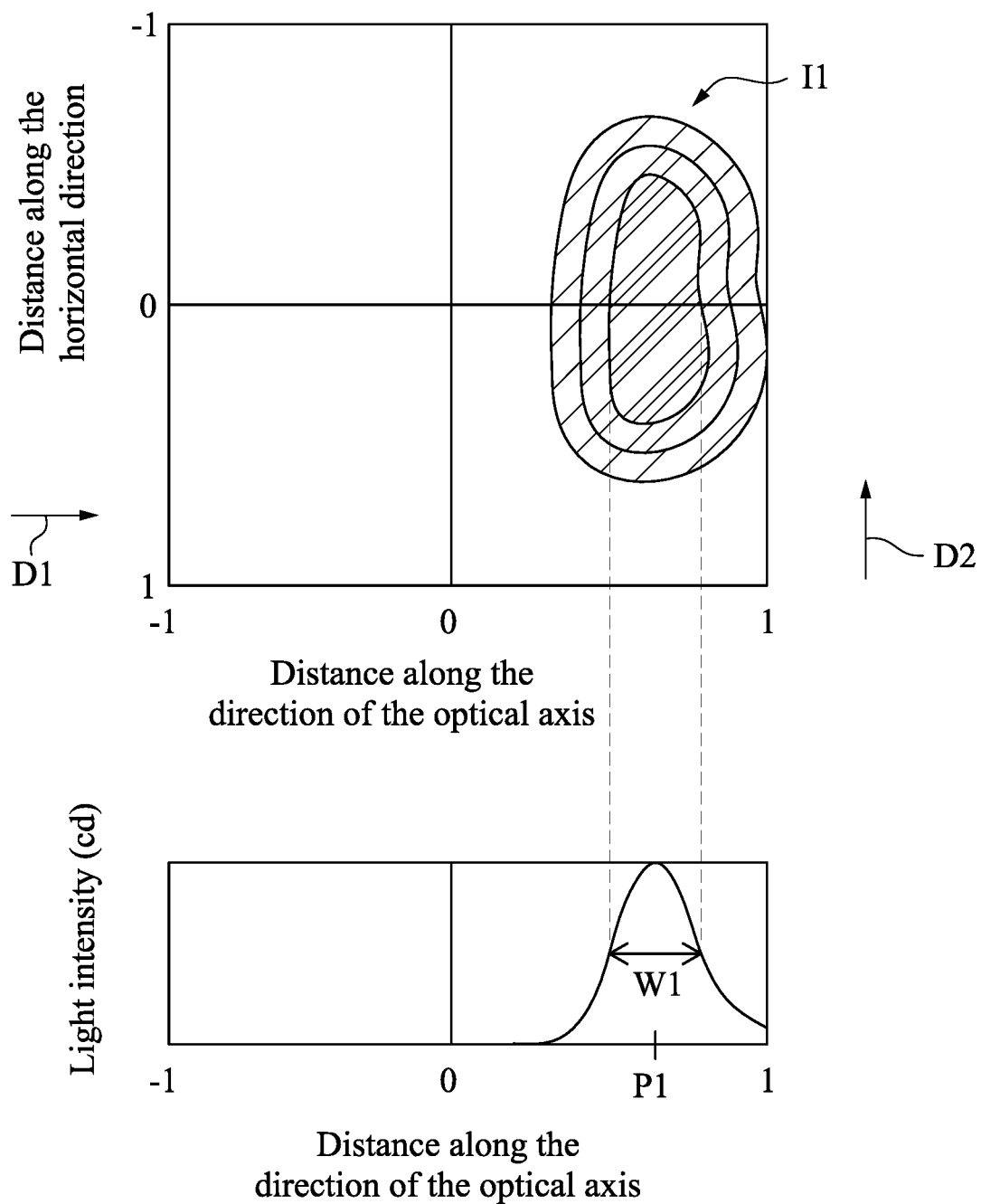
FIG. 5B is a simulation diagram of the light width of the display device in FIG. 5A.

Reference is made to FIG. 5A and FIG. 5B. FIG. 5A is a schematic of a light path of an exemplary display device. FIG. 5B is a simulation diagram of the light width of the display device in FIG. 5A. FIG. 5B is a contour map (top of FIG. 5B) of simulation of the light intensity of the emitting light I1 in FIG. 5A and a distribution diagram of the light intensity along the direction of the optical axis D1 (bottom of FIG. 5B). The microstructure 122' of the light guide plate 120' of the display device 10 in FIG. 5A may be the conventional design, for example, linear groove.

As shown in FIG. 5A, the incident light I1 transmitted toward the display panel 200 after being guided by the light guide plate 120 may pass the region correspond to the sub-pixel 310. The transmission direction of the incident light I1 and the vertical direction D3 (that is the normal direction of the light guide plate 120) have a light angle A1, and the light angle A1 is in a range of 62.5 degrees to 67.5 degrees. As shown in FIG. 5B, the wave peak of the incident light I1 is located at position P1 in the distribution diagram of the light intensity, and the position P1 corresponds to the location P1 deviating from the vertical direction D3 about 65 degrees in FIG. 5A. The light angle A1 can be calculated based on the peak. In the subsequent paragraphs, the angle of the incident light I1 deviating from the vertical direction D3 will be described by using the light angle A1.

As shown in FIG. 5A, the incident light I1 has a light width W1 defined by the light boundary IR1, and the light width W1 is about 30 degrees. As shown in FIG. 5B, the incident light I1 has a full width at half maximum (FWHM) in the distribution diagram of the light intensity that is the same as the light width W1, and the FWHM is about 30 degrees corresponding to the light width W1 in FIG. 5A. It is noted that, as shown in FIG. 5A and FIG. 5B, the light width of the incident light I1 has a divergence region with a solid angle (steradian). To describe conveniently, the light width WW1 along the direction of the light axis D1 is used as a criteria to compare the divergent levels of the incident light I1.

According to the FIG. 5A and FIG. 5B, the reflection light R1 transmits toward the light guide plate 120' is formed after the incident light I1 is reflected by the display panel 200. The reflection light R1 has a light width defined by the light boundary RR1. Since the incident light I1 has a wider light width, the reflection light R1 also has a wider light width. Therefore, the reflection light R1 may transmits through the region corresponding to the sub-pixel 310 and the sub-pixel 320. In other words, if the angle of the incident light I1 deviates from the vertical direction D3 is large, the possibility for mixing the lights from adjacent two sub-pixels may be increased. As a result, the color saturation of the display device 10 may be reduced.

Figure 6A:
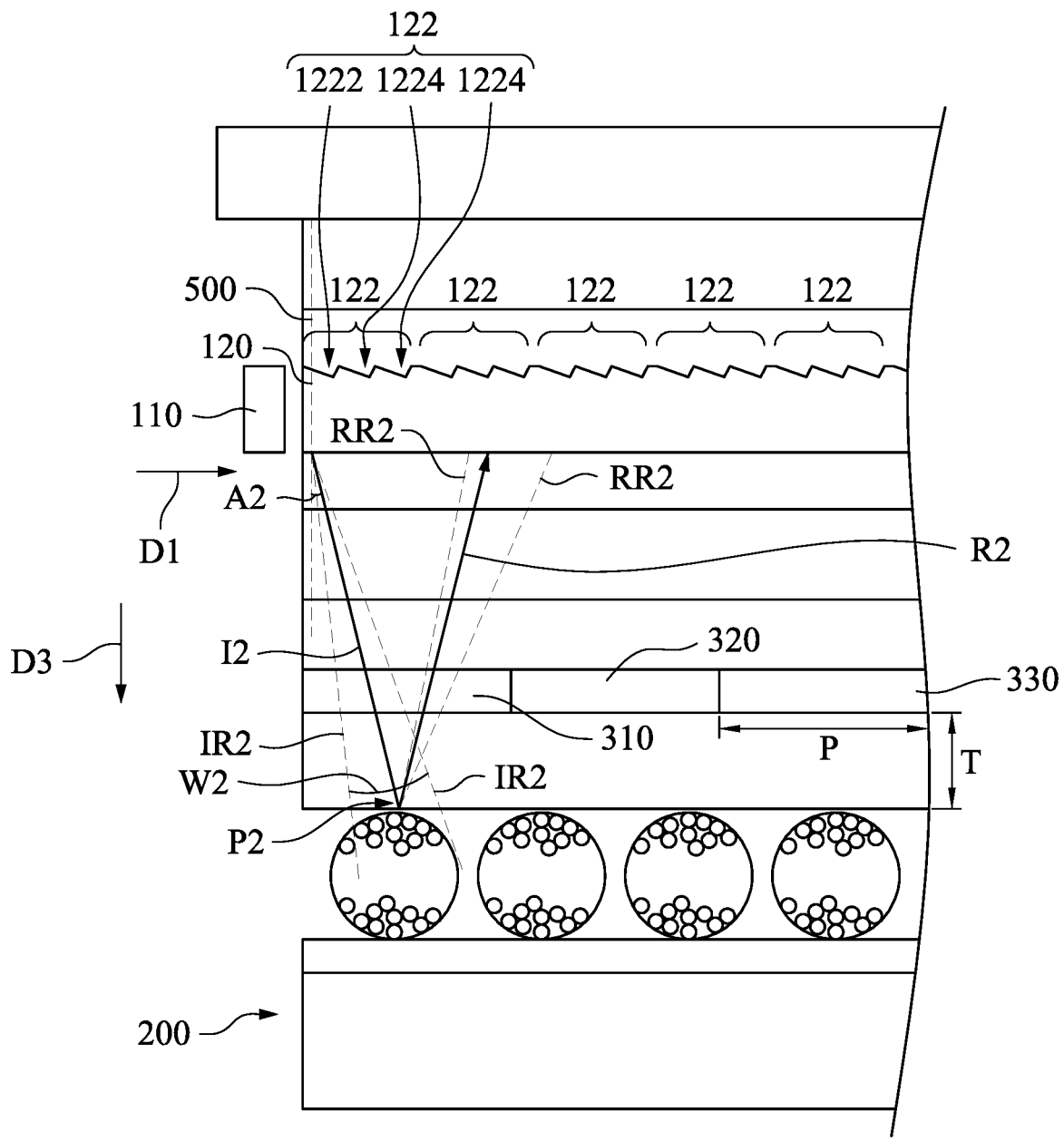
FIG. 6A is a schematic of a light path of the display device in FIG. 1.
Figure 6B:
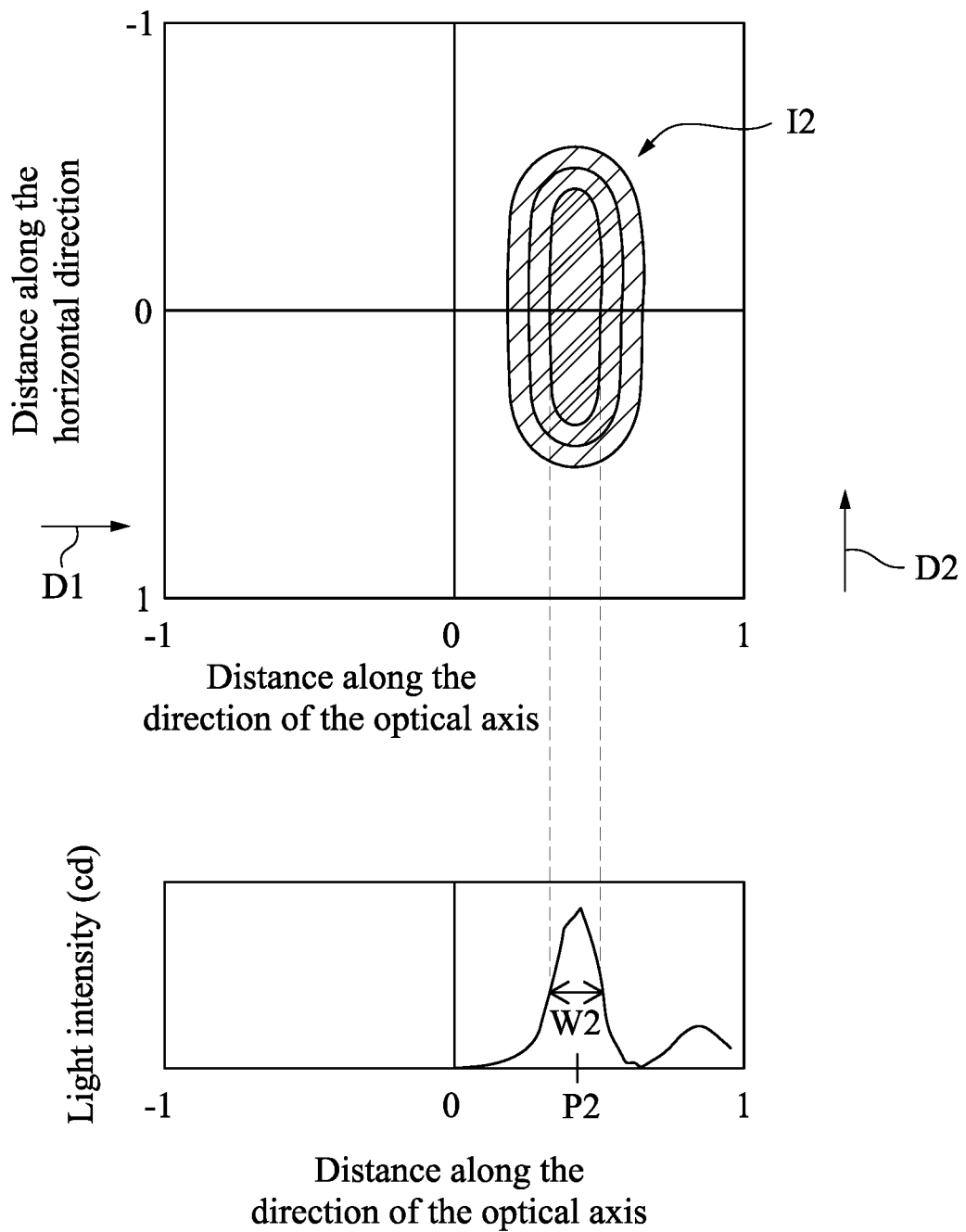
FIG. 6B is a simulation diagram of the light width of the display device in FIG. 6A.

Reference is made to FIG. 6A and FIG. 6B. FIG. 6A is a schematic of a light path of the display device 10 in FIG. 1. The microstructure in FIG. 6A may be the first microstructure 1222 and the second microstructure 1224 shown in FIG. 4. In the embodiment shown in FIG. 6A, the materials and refractive indexes of the light guide plate 120 and the optical adhesive layer 500 may be the same as those in FIG. 4. FIG. 6B is a simulation diagram of the light width of the display device 10 in FIG. 6A. FIG. 6B is a contour map (top of FIG. 6B) of simulation of the light intensity of the emitting light I2 in FIG. 6A and a distribution diagram of the light intensity along the direction of the optical axis D1 (bottom of FIG. 6B).

As shown in FIG. 6A, the incident light I2 transmitted toward the display panel 200 after being guided by the light guide plate 120 may pass the region corresponding to the sub-pixels 332. The transmission direction of the incident light I2 and the vertical direction D3 have a light angle A2, and the light angle A2 is in a range of 32.5 degrees to 37.5 degrees. As shown in FIG. 6B, the wave peak of the incident light I2 is located at position P2 in the distribution diagram of the light intensity, and the position P2 corresponds to the location P2 deviating from the vertical direction D3 about 35 degrees in FIG. 6A. The light angle A2 in FIG. 6A can be calculated based on the peak. In the subsequent paragraphs, the angle of the incident light I2 deviating from the vertical direction D3 will be described by using the light angle A2.

As shown in FIG. 6A, the incident light I2 has a light width W2 defined by the light boundary IR2, and the light width W2 is about 15 degrees. As shown in FIG. 6B, the incident light I2 has a FWHM in the distribution diagram of the light intensity that is the same as the light width W2, and the FWHM is about 15 degrees corresponding to the light width W2 in FIG. 6A. It is noted that, as shown in FIG. 6A and FIG. 6B, the light width of the incident light I2 has a divergence region with a solid angle (steradian). To describe conveniently, the light width W2 along the direction of the light axis D1 is used as a criteria to compare the divergent levels of the incident light I2.

According to the FIG. 6A and FIG. 6B, the reflection light R2 transmits toward the light guide plate 120 is formed after the incident light I2 is reflected by the display panel 200. The reflection light R2 has a light width defined by the light boundary RR2. Since the incident light I2 has a narrower light width W2, the reflection light R2 also has a narrower light width. Therefore, the reflection light R2 may transmits through the region corresponding to the sub-pixel 310, but not the region corresponding to the sub-pixel 320. In other words, by disposing the first microstructure 1222 and at least one second microstructure 1224 in the microstructure region 122, the light may be guided several times to transmit toward the display panel 200 more vertically so as to reduce the angle of the incident light I2 deviating from the vertical direction D3 (e.g., the light angle A1 in FIG. 5A is reduced to the light angle A2). As such, the possibility for mixing the lights from adjacent two sub-pixels can be decreased so as to increase the color saturation of the display device 10. In addition, since the reflection light L2, L3 (see FIG. 4) reflected by the second microstructure 1224 can transmit downward more vertically, the incident light I2 transmits toward the display panel 200 can be more concentrated, and the light width W2 is narrower (e.g., the light width W1 in FIG. 5A is reduced to light width W2). As such, the light scattering of the light guide plate 120 due to light guiding may be reduced and the light collimation of the light guide plate 120 may be enhanced.

Figure 7:
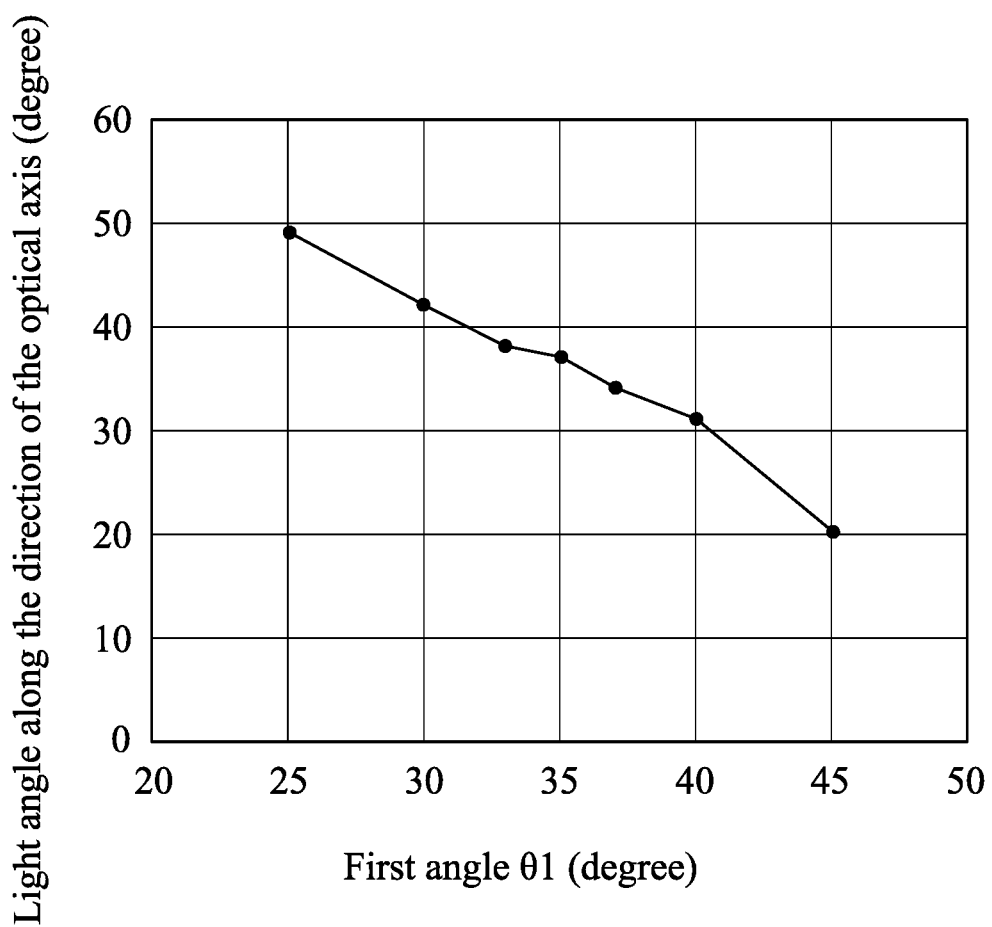
FIG. 7 is a relation diagram of the first angle and the light angle according to one embodiment of the present disclosure.
Figure 8:
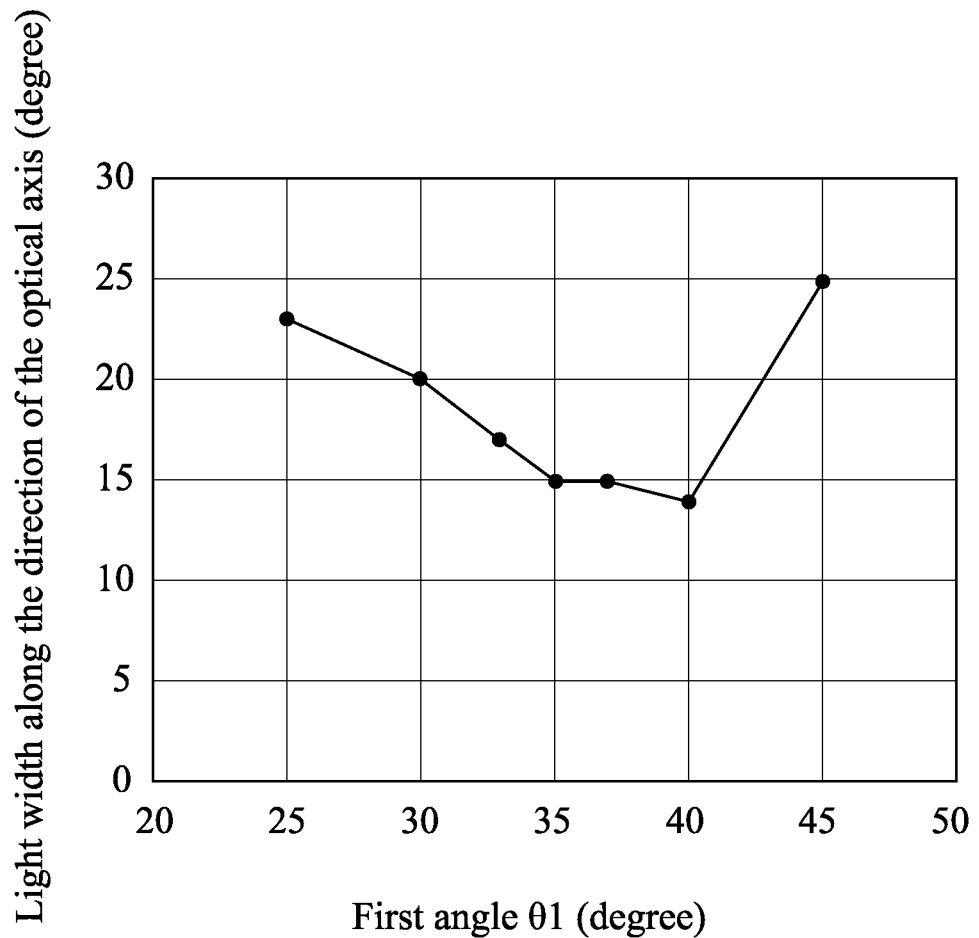
FIG. 8 is a relation diagram of the first angle and the light width according to one embodiment of the present disclosure.

FIG. 7 is a relation diagram of the first angle and the light angle according to one embodiment of the present disclosure. FIG. 8 is a relation diagram of the first angle and the light width according to one embodiment of the present disclosure. Data in FIG. 7 and FIG. 8 are calculated based on the materials and refractive indexes of the light guide plate 120 and the optical adhesive layer 500 in FIG. 4. As shown in FIG. 7, when the first angle θ1 of the first microstructure 1222 (see FIG. 4) is increased from about 25 degrees to about 45 degrees, the corresponding light angle (that is the angle of the reflection light deviating from the vertical direction) gradually decreased from about 50 degrees to about 20 degrees. As shown in FIG. 8, the first angle θ1 of the first microstructure 1222 (see FIG. 4) is increased from about 25 degrees to about 45 degrees, the corresponding light width gradually decreases from about 23 degrees to about 40 degrees, and then the light width is increased to about 25 degrees.

Specifically, by using the incident light L0 in FIG. 4 as an example, when the first angle θ1 is in a range of 40 degrees to 45 degrees, the incident angle of the reflection light L0 is reduced. As such, there is almost no total reflection when the incident light L0 passes through the first microstructure 1222, such that the transmission light L1' is increased and the light width is expanded due to scattering. On the contrary, when the first angle θ1 is smaller than 30 degrees, the angle between the reflection light L1 and the vertical direction D3 may be too large, such that the possibility for mixing the lights from adjacent two sub-pixels may be increased. Therefore, it can be derived that the first angle θ1 of the present embodiment is preferred to be in a range of 32.5 degrees to 37.5 degrees based on the data in FIG. 7 and FIG. 8.

Accordingly, by using the first angle θ1 of the first microstructure 1222 with the second microstructure 1224, the light width can be prevented from increasing due to the excessive first angle θ1. At the same time, the transmission light L1' and the transmission light L2' can be guided again so as to form the reflection light L2 and the reflection light L3 that are transmit toward the direction more close to the vertical direction, such that the incident light facing the display panel may has smaller light angle and the light width as well.

Reference is made to FIG. 1. For example, in some embodiments, when the refractive index of the optical adhesive layer 500 is about 1.41, the difference between the refractive index of the optical adhesive layer 500 and the refractive index of the light guide plate 120 is about 0.15 to 0.25. At this time, the first angle θ1 is preferred to be in a range of 37.5 degrees to 42.5 degrees. In some embodiment, the top surface 124 of the light guide plate 120 and the optical adhesive layer 500 are separated by an air layer (refractive index is 1), and the difference between the refractive index of the air layer and the refractive index of the light guide plate 120 (1.59) is about 0.55 to 0.60. At this time, the first angle θ1 is preferred to be in a range of 42.5 degrees to 47.5 degrees. In other words, the first angle θ1 between the first microstructure 1222 and the direction of the optical axis D1 if preferred to be in a range of 30 degrees to 50 degrees.

Reference is made to FIG. 1, in the present embodiment, the display device 10 further includes a touch layer 600 located between the cover structure 400 and the optical adhesive layer 500, but the present disclosure is not limited in this regard. Specifically, the display device 10 may have different laminated structures with different functions, and the skilled person may increase or decrease the laminated structures depend on the practical requirements.

Figure 9:
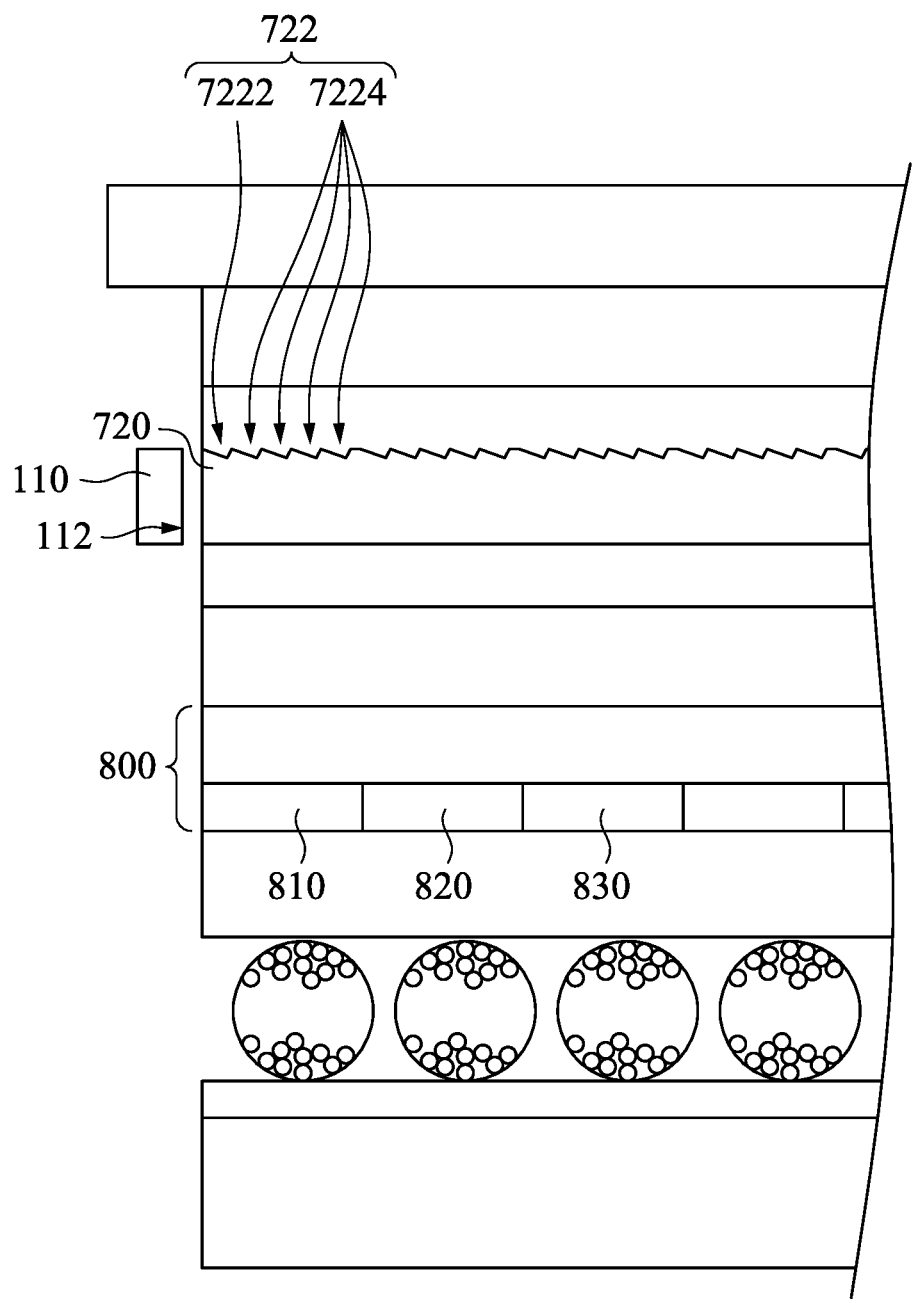
FIG. 9 is a cross-sectional view of a display device according to another embodiment of the present disclosure.
Figure 10A:
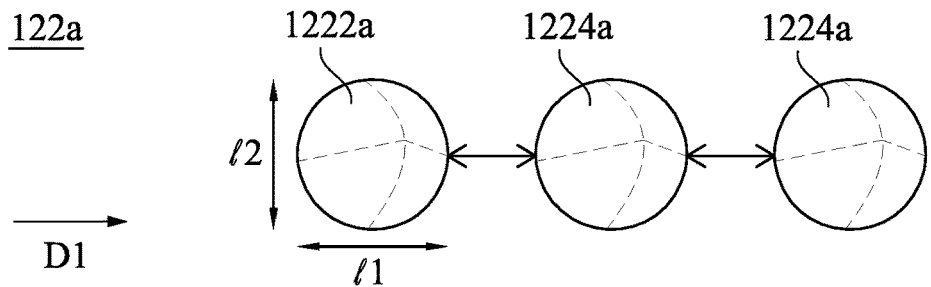
FIGS. 10A to 10D are top views of the microstructures according to various embodiments of the present disclosure.
Figure 10B:
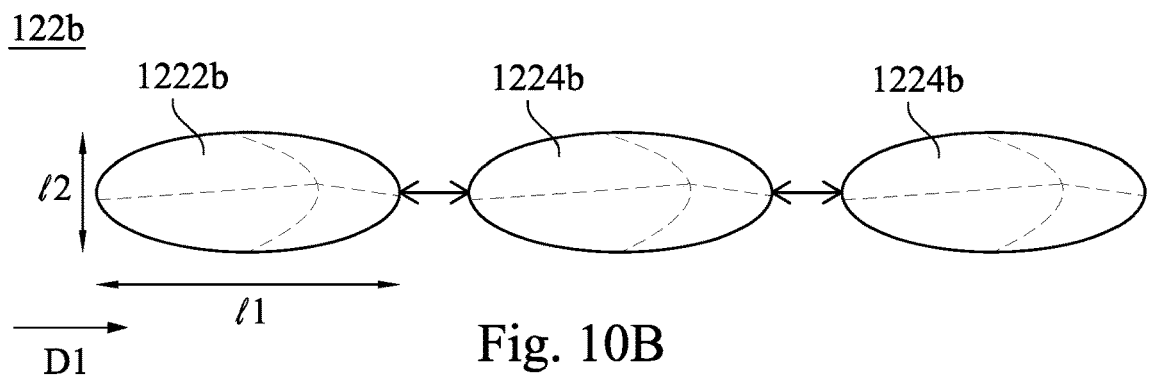
Figure 10C:
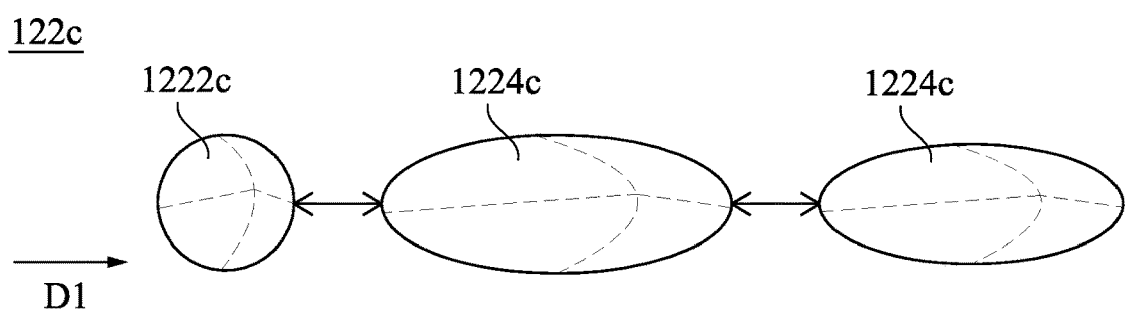
Figure 10D:
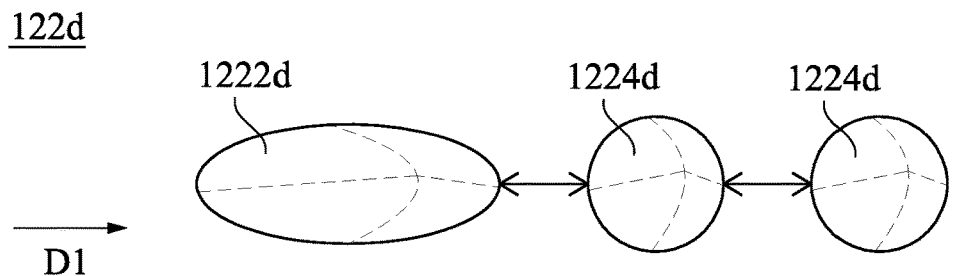

FIG. 9 is a cross-sectional view of a display device 20 according to another embodiment of the present disclosure. The display device 20 is substantially the same as the display device 10 in FIG. 5B, and the difference is that widths of the sub-pixels 810, 820, 830 are smaller, and numbers of the second microstructures 7224 of which each of the sub-pixels 810, 820, 830 corresponds to are greater.

Reference is made to FIG. 6A and FIG. 9 simultaneously. The total thickness of the display device 10 and the display device 20 is about 2050 micrometers. In some other embodiments, the total thickness is in a range of 1700 micrometers to 2400 micrometers, and it can be adjusted depend on practical requirements of the function and the thickness limitation of the material.

As shown in FIG. 6A, the thickness T of the adhesive layer 230 is used as an example. When the thickness T is smaller, the possibility for mixing the lights from adjacent two sub-pixels may be lower. However, by using the width P of the sub-pixel 330 as an example, when the width P is greater, the possibility for mixing the lights from adjacent two sub-pixels may be lower. Specifically, when considering a display panel with 300 dpi resolution, the width P of stripe sub-pixels 310, 320, 330 are about 80 micrometers, and the width of mosaic sub-pixels are about 120 micrometers. When the display panel has the same size as other display panel but has a higher resolution, the width P of the sub-pixels 310, 320, 330 are smaller. Under this condition, the possibility for mixing the lights is influenced by the light angle and the light width more severely. That is, the color saturation is influenced more severely. Therefore, the smaller the widths P of the sub-pixels 310, 320, 330, the greater the number of the second micrometers 1224 so as to enhance the level of the light being guided toward the vertical direction D3. Specifically, as shown in FIG. 9, the number of the second microstructures 7224 is five at most.

Accordingly, for a display device with higher resolution, the color saturation is influenced by the light angle and the light width more severely. Therefore, the light angle and the light width of the display device of the present disclosure may be reduced by adjusting the number of the second microstructures in the microstructure region and adjusting the angle between the first microstructure and the second microstructure (that is the first angle θ1, the second angle θ2, the third angle θ3, and the fourth angle θ4), such that the display quality of display devices with different resolution can be satisfied. Therefore, the design of the microstructure region of the present disclosure can be applied in the display devices with different resolution and have better versatility.

FIGS. 10A to 10D are top views of the microstructures according to various embodiments of the present disclosure. The first microstructure 1222a and the second microstructure 1224a of the microstructure region 122a in FIG. 10A all have circular shapes (the first length l1 is equal to the second length l2). In some embodiments, the second length l2 may be greater than the first length l1. The first microstructure 1222b and the second microstructure 1224b of the microstructure region 122b in FIG. 10B all have ellipse shapes (the first length l1 is greater than the second length l2). In some embodiments, the second length l2 may be greater than the first length l1. In some embodiments, the second length l2 may be greater than the first length l1. The first microstructure 1222c of the microstructure region 122c in FIG. 10C has a circular shape, and the second microstructure 1224c of the microstructure region 122c has an ellipse shape. The first microstructure 1222d of the microstructure region 122d in FIG. 10D has an ellipse shape, and the second microstructure 1224d of the microstructure region 122d has a circular shape. In some embodiment, several second microstructures 1224 may have different shape when viewed from above (e.g., diamond shape) as long as the second angle θ2 and the third angle θ3 corresponding to FIG. 4 are the same.

Figure 11:
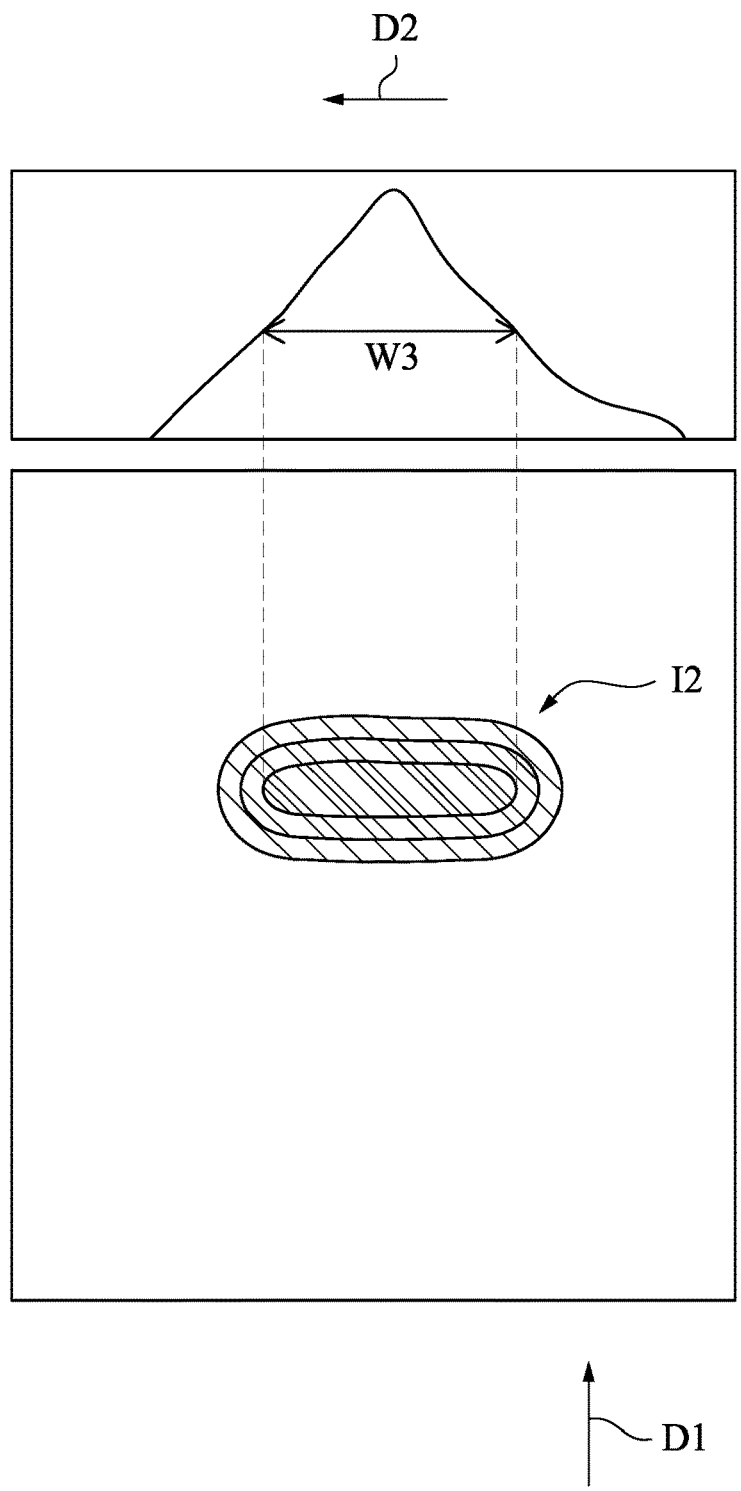
FIG. 11 is a simulation diagram of the light width of the display device in FIG. 6A.

FIG. 11 is a simulation diagram of the light width of the display device 10 in FIG. 6A. FIG. 11 is a contour map of simulation of the light intensity of the emitting light I2 in FIG. 6A and a distribution diagram of the light intensity along the horizontal direction D2. According to the distribution diagram of the light intensity of the incident light I2, the FWHM of the incident light I2 along the horizontal direction D2 corresponds to the light width W3. As described above, the incident light I2 has a divergence region with a solid angle (steradian). The light width W3 along the horizontal direction D2 is used as a criteria to compare the divergent levels of the incident light I3.

Figure 12:
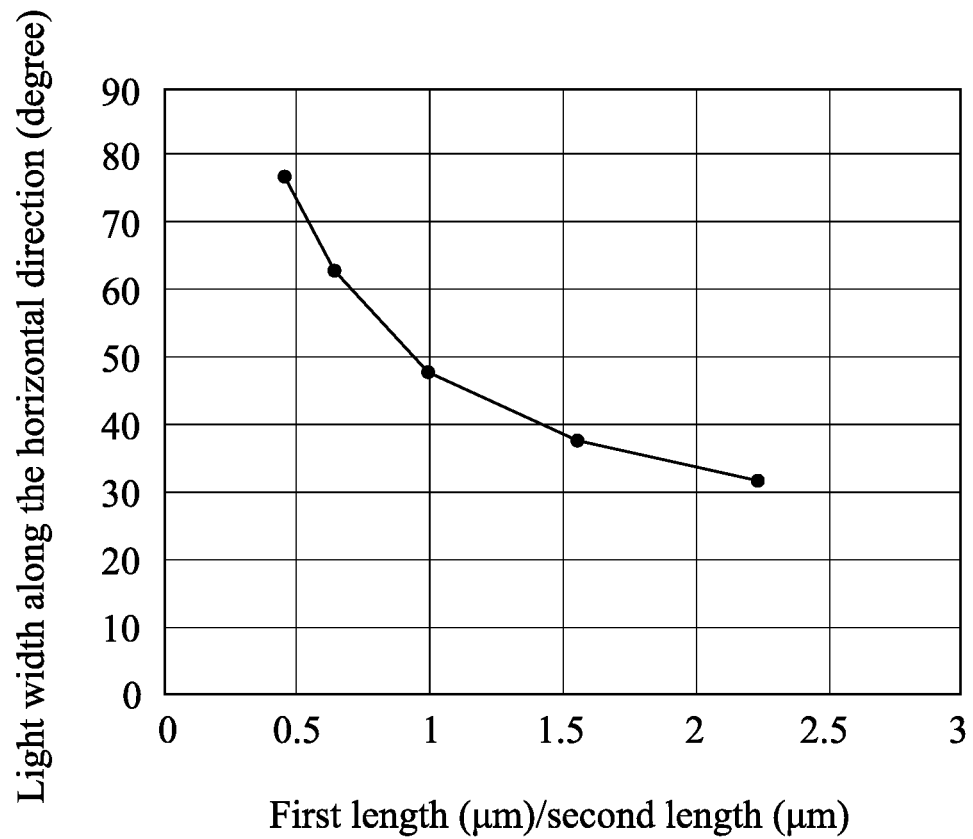
FIG. 12 is a relation diagram of a ratio between a first length and a second length and a light width along a horizontal direction.

FIG. 12 is a relation diagram of a ratio between a first length and a second length and a light width along a horizontal direction. FIG. 13 is a data of the first length, the second length, and the light width along the horizontal direction in FIG. 12. Reference is made to FIG. 12 and FIG. 13 simultaneously, when the ratio between the first length l1 and the second length l2 is smaller than 0.5. For example, it may be similar to the conventional linear groove. As such, the light width W3 along the horizontal direction D2 may be over about 80 degrees. When the ratio between the first length l1 and the second length l2 is in a range of 0.5 to 2.5. The light width W3 along the horizontal direction D2 may be lower than about 70 degrees. When the ratio between the first length l1 and the second length l2 is close to 2.5, the light width W3 along the horizontal direction D2 may be reduced to about 30 degrees. For example, when the ratio between the first length l1 and the second length l2 is about 2, the light width W3 may be in a range of 32 degrees to 38 degrees. Accordingly, by designing the shapes of the first microstructure 1222 and the second microstructure 1224 when view from above as circular shape, the ellipse shape, and the diamond shape, and by makes the ratio between the first length l1 and the second length l2 be in a range of 0.5 to 2.5, the light width W3 along the horizontal direction D2 may be reduced and the light collimation of the light guide plate 120 may be enhanced.

In summary, by disposing the first microstructure and at least one second microstructure in the microstructure region, and by adjusting the first angle and the second angle of the first microstructure and the third angle of the second microstructure, the angle between the light transmits toward the display panel and the vertical direction (the normal direction of the light guide plate) can be reduced. As such, the possibility for mixing the lights from adjacent two sub-pixels can be decreased so as to increase the color saturation of the display device. In addition, since the light may transmits downward more vertically after being reflected by the second microstructure, the light incident toward the display panel can be more concentrated, and the light width is narrower. As such, the light scattering of the light guide plate due to light guiding may be reduced and the light collimation of the light guide plate may be enhanced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A front light module, comprising:
a light source having a light emitting surface; and
a light guide plate having a microstructure region, wherein the microstructure region includes a first microstructure and at least one second microstructure, the first microstructure is located between the light emitting surface of the light source and the second microstructure, a surface of the first microstructure closer to the light source and a direction of an optical axis of the light source have a first angle therebetween, a surface of the first microstructure further away from the light source and the direction of the optical axis have a second angle therebetween, a surface of the second microstructure away from the light source and the direction of the optical axis have a third angle therebetween, the first angle is in a range of 30 degrees to 50 degrees, the second angle and the third angle are in a range of 60 degrees to 90 degrees, the first microstructure and the second microstructure each has a first length along a direction of an optical axis of the light source and a second length along a horizontal direction perpendicular to the direction of the optical axis, and a ratio of the first length over the second length is in a range of 0.5 to 2.5.

2. The front light module of claim 1, wherein the first microstructure and the second microstructure are recessed from a top surface of the light guide plate.

3. The front light module of claim 1, wherein when viewed from above, the first microstructure and the second microstructure each has a circular shape, an ellipse shape or a diamond shape.

4. The front light module of claim 1, wherein a surface of the second microstructure close to the light source and the direction of an optical axis have a fourth angle therebetween, and the fourth angle is the same as the first angle.

5. The front light module of claim 1, wherein the second angle is the same as the third angle.

6. The front light module of claim 1, wherein a number of the second microstructure is plural, and the third angles of the second microstructures are the same.

7. The front light module of claim 1, further comprising a color filter layer, wherein the color filter layer has a sub-pixel, and a number of the second microstructure increases as a width of the sub-pixel decreases.

8. The front light module of claim 1, wherein the first microstructure and one of adjacent two of the second microstructures have a distance therebetween, and the distance is in a range of 1 micrometer to 20 micrometers.

9. The front light module of claim 1, wherein the first microstructure is connected with the second microstructure.

10. The front light module of claim 1, wherein a number of the second microstructure is plural, and the second microstructures are connected with each other.

11. A display device, comprising:
a front light module, comprising:
a light source having a light emitting surface; and a light guide plate having a microstructure region, wherein the microstructure region includes a first microstructure and at least one second microstructure, the first microstructure is located between the light emitting surface of the light source and the second microstructure, a surface of the first microstructure closer to the light source and a direction of an optical axis of the light source have a first angle therebetween, a surface of the first microstructure away from the light source and the direction of the optical axis have a second angle therebetween, a surface of the second microstructure further away from the light source and the direction of the optical axis have a third angle therebetween, the first angle is in a range of 30 degrees to 50 degrees, the second angle and the third angle are in a range of 60 degrees to 90 degrees, the first microstructure and the second microstructure each has a first length along a direction of an optical axis of the light source and a second length along a horizontal direction perpendicular to the direction of the optical axis, and a ratio of the first length over the second length is in a range of 0.5 to 2.5; and a display panel located below the light guide plate.

12. The display device of claim 11, wherein the first microstructure and the second microstructure are recessed from a top surface of the light guide plate.

13. The display device of claim 11, wherein when viewed from above, the first microstructure and the second microstructure each has a circular shape, an ellipse shape, or a diamond shape.

14. The display device of claim 11, wherein a surface of the second microstructure close to the light source and a direction of an optical axis have a fourth angle therebetween, and the fourth angle is the same as the first angle.

15. The display device of claim 11, wherein the second angle is the same as the third angle.

16. The display device of claim 11, wherein a number of the second microstructure is plural, and the third angles of the second microstructures are the same.

17. The display device of claim 11, further comprising a color filter layer, wherein the color filter layer has a sub-pixel, and a number of the second microstructure increases as a width of the sub-pixel decreases.

18. The display device of claim 11, wherein the first microstructure and one of adjacent two of the second microstructures have a distance therebetween, and the distance is in a range of 1 micrometer to 20 micrometers.

19. A front light module, comprising:
a light source having a light emitting surface;
a light guide plate having a microstructure region, wherein the microstructure region includes a first microstructure and at least one second microstructure, the first microstructure is located between the light emitting surface of the light source and the second microstructure, a surface of the first microstructure close to the light source and a direction of an optical axis of the light source have a first angle therebetween, a surface of the first microstructure away from the light source and the direction of the optical axis have a second angle therebetween, a surface of the second microstructure away from the light source and the direction of the optical axis have a third angle therebetween, the first angle is in a range of 30 degrees to 50 degrees, and the second angle and the third angle are in a range of 60 degrees to 90 degrees; and
a color filter layer, wherein the color filter layer has a sub-pixel, and a number of the second microstructure increased as a width of the sub-pixel decreases.

20. A display device, comprising:
a front light module, comprising:
a light source having a light emitting surface;
a light guide plate having a microstructure region, wherein the microstructure region includes a first microstructure and at least one second microstructure, the first microstructure is located between the light emitting surface of the light source and the second microstructure, a surface of the first microstructure close to the light source and a direction of an optical axis of the light source have a first angle therebetween, a surface of the first microstructure away from the light source and the direction of the optical axis have a second angle therebetween, a surface of the second microstructure away from the light source and the direction of the optical axis have a third angle therebetween, the first angle is in a range of 30 degrees to 50 degrees, and the second angle and the third angle are in a range of 60 degrees to 90 degrees; and
a color filter layer, wherein the color filter layer has a sub-pixel, and a number of the second microstructure increased as a width of the sub-pixel decreases; and
a display panel located below the light guide plate.

* * * * *